Aug. 3, 1926. 1,594,434
J. T. TRUMBLE
REAR AXLE HOUSING
Filed Nov. 26, 1923
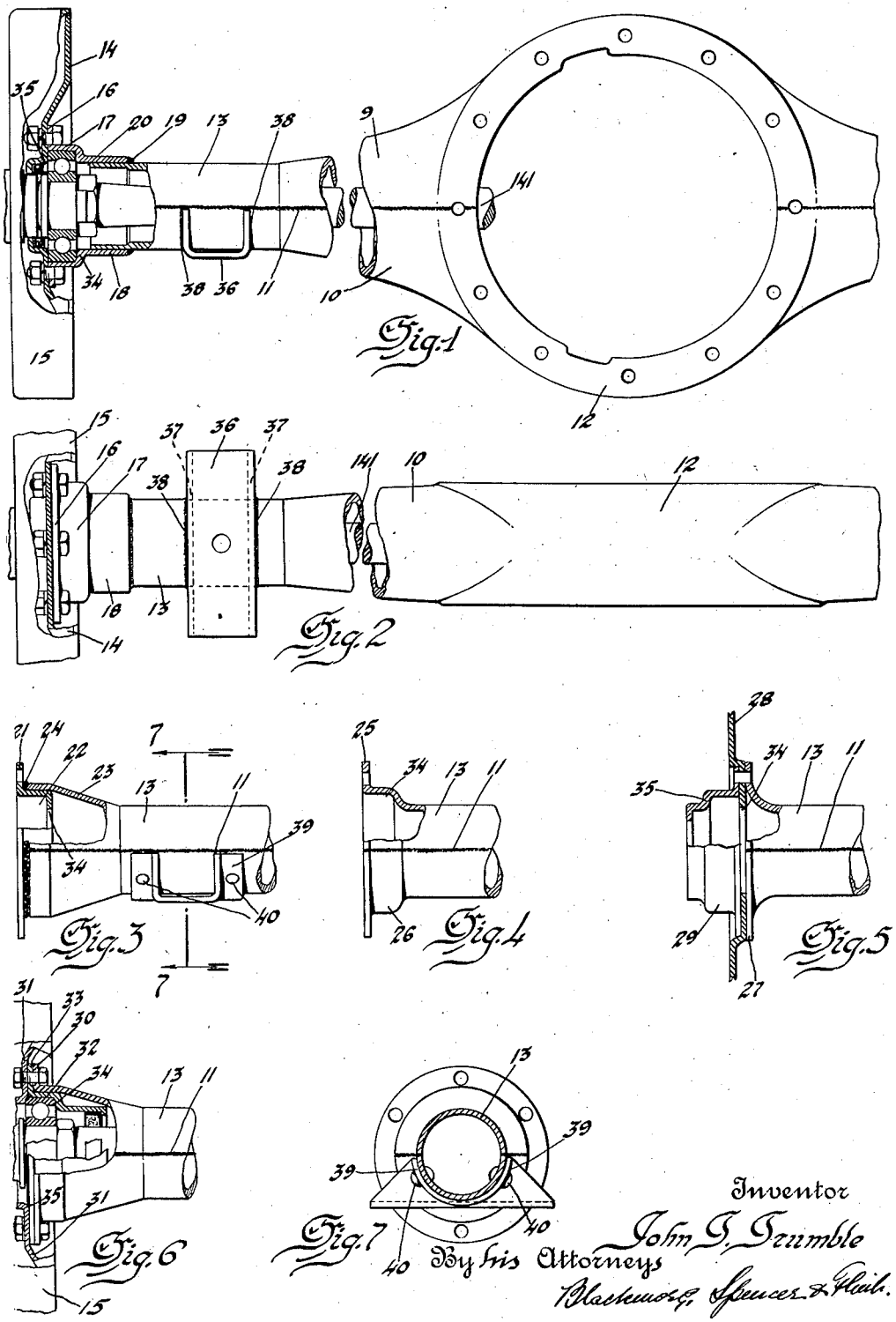
Inventor
John T. Trumble
By his Attorneys
Blackmore, Spencer & Flail Patented Aug. 3, 1926.

1,594,434

UNITED STATES PATENT OFFICE.

JOHN T. TRUMBLE, OF LANSING, MICHIGAN, ASSIGNOR TO GENERAL MOTORS CORPORATION, OF DETROIT, MICHIGAN, A CORPORATION OF DELAWARE.

REAR-AXLE HOUSING.

Application filed November 26, 1923. Serial No. 677,016.

My invention relates to the tubular housing or casing wherein the differential gearing, and the axles through which the rear wheels of a motor driven-vehicle are driven, are contained and supported in proper relation to one another; and the principal object thereof is to provide an improved plan or scheme for securing the usual brake supporting plates or discs to the ends of said housing, and for supporting the ball or equivalent bearings which in turn support the outer ends of the driving axles, all as will hereinafter and at length appear. A further object of my invention is to provide an improved arrangement and relationship of the brake supporting discs or plates whereby said member acts also to hold the outer rear axle bearings in place relative to the ends of the axle housing or casing; and a still further object is to provide improved spring pads or supports for supporting the springs whereby the frame and body of the vehicle are supported from the rear axle housing.

With the above and other objects of invention in view my invention consists in the features associated with rear axle housings illustrated in the drawing which accompanies and forms a part of this specification, and hereinafter described in detail and particularly claimed; and in such variations and modifications thereof, within the scope of the concluding claims, as will be obvious to those skilled in the art to which my invention relates.

Referring now to the drawing:—

Figure 1 is a view partly in section and partly in elevation showing about one-half of a rear axle housing having various features and parts associated therewith in accordance with my invention;

Figure 2 is a view corresponding with Figure 1, but showing the parts in plan;

Figures 3 to 6 inclusive are fragmentary views showing various modified forms of my invention to be hereinafter described separately;

Figure 7 is a view showing a section upon a vertical transverse plane indicated by the line 7, 7, Figure 3.

It will be appreciated that one end only of a rear axle housing and associated parts and features is illustrated and that while the following description is in the singular number, the elements and features of construction referred to in each particular case are duplicated at the two ends of the rear axle housing.

The rear axle housing or casing with which my invention is associated is shown as made up of upper and lower halves 9, 10 U-shaped or semi-circular in cross section, and which parts are secured together along a longitudinally extended seam 11 by welding the meeting edges of the parts together; the two parts being formed from suitably shaped wrought iron or mild steel sheet metal blanks bent and shaped, as by the use of suitable dies, so that the resulting casing comprises an enlarged central portion 12 having oppositely disposed openings closed by a support for the differential gearing, not shown, and by a cover plate; said housing having also tubular end portions 13 extending from said enlarged central portion and through which the axles 14 which drive the vehicle wheels extend; all as is usual in rear axle constructions of the type to which my invention relates, one only of the axles and tubes being shown as the drawing shows only about half the rear axle assembly as above explained.

The reference numeral 14 designates an annular disc or plate which is fixedly secured to a wrought metal flange of the outer end of the tubular portion and which is restrained from rotary movement because of its being thus secured to the axle housing, which is itself incapable of rotation; and which plate carries the brake band or equivalent member which cooperates with the brake drum 15 which rotates with the wheel, not shown, this construction being the same for both the rear wheels of the vehicle, as will be appreciated.

Heretofore the connection between the disc or plate and the rear axle housing has commonly been provided by securing the disc to a comparatively massive sleeve made from cast or malleable iron, the sleeve being in turn secured to the outer end of the axle housing by suitable fastening members such as bolts or rivets. The cast metal member thus employed, however, has been objectionable because of its considerable weight to provide requisite strength, and its inordinate cost due to the fact that various boring, turning and like machine tool operations had to be performed upon it; and objectionable even to a greater degree because the joint between the parts could not be made continuous and homogeneous throughout its entire area as it was impossible to form a welded joint between the cast metal from which the sleeve was formed and the wrought metal of mild steel used in making the axle housing. My invention, therefore, contemplates the discarding the cast metal sleeve heretofore usually employed and in establishing a connection between the brake supporting disc or plate and the axle housing through a wrought metal flange disposed adjacent the end of the tubular portion of the axle housing; to which flange the said disc or plate is fastened by any of the usual fastening means such as bolts, screws or rivets commonly employed for such purposes. Such a connection is materially stronger than one provided by a cast metal sleeve of equal dimensions; the flange involved therein can be made by the use of suitable dies by familiar metal shaping and drawing operations, and at a much less cost than an equivalent cast metal member; and said flange, being of wrought metal can when it is not integral with the axle housing be welded thereto; thus providing a stronger joint between the parts than is secured by a riveted joint necessary when a cast metal sleeve is employed in providing a connection between the axle housing and the brake supporting discs.

In the form of my invention illustrated in Figures 1 and 2 a flange 16 extends outwardly from the tubular portion 13 and relative to the axis thereof, and is substantially radial; although my invention is not limited to a flange extending exactly at right angles to the tubular member. The inner edge of the annular brake carrying disc 14 is fastened to this flange by suitable bolts or rivets, and likewise extends outwardly from the tubular member and is preferably disposed radially or substantially at right angles thereto. The flange 16 in this form of my invention is formed as an integral part of a wrought metal member which is so shaped, as by the use of suitable dies, as to provide a cylindrical bearing seat 17 which receives the outer ball race of a ball bearing of ordinary form, and to provide also a neck portion 18 of such internal form and size as to receive the end of the tubular portion 13 of the axle housing. Finally the wrought metal member made up of the flange, the bearing seat and the neck portion is welded to the end of the tubular portion along one or more circumferentially extending joints 19, 20; one inside and the other outside the axle housing in this particular embodiment of my invention.

The wrought metal combined flange and bearing seat member when made separately from the axle housing (which is the preferred plan, as in that case the member may be more readily and accurately formed than when the flange and seat are integral with the housing) need not necessarily fit upon the outside of the tubular extension 13, as in the form of my invention above described. Thus in Figure 3 I have illustrated a form of my invention in which the flange 21 and cylindrical bearing seat 22 are formed from a wrought metal blank by subjecting it to suitable die shaping operations; and the end of the tube 13 is expanded at 23 and so shaped as to receive the cylindrical bearing seat 22 within its enlarged outer end. The combined flange and seat member is then secured to the axle housing by welding it thereto along a circumferentially extending seam at 24.

Figure 4 illustrates a form of my invention wherein a wrought metal flange 25 extends outwardly from a cylindrical bearing seat 26, both of which are integral with the housing tube 13; said parts being formed by upsetting and expanding the end of the tube, and so shaping it as to provide said elements. In this form of my invention there is obviously no welded joint between the flange and bearing seat member and the tubular portion of the axle housing.

Figure 5 illustrates a form of my invention wherein the outer end of the tubular portion 13 is flared to provide a flange 27 to which the annular brake supporting disc or plate 28 is fastened as by suitable bolts; and wherein the bearing seat 29 is formed in a separate suitably shaped member which is independent of the axle housing and of the flange to which the brake carrying disc is secured. In this form of my invention the bearing seat is outside the brake carrying disc, while in the forms heretofore described it is inside said disc at the point where said disc is fastened to the flange whereby it is supported, as will be appreciated.

Figure 6 shows a form of my invention in which the outer end of the tubular portion 13 of the housing is expanded to provide a flange 30 to which the inner edge of the brake supporting disc 31 is fastened, much as in the form illustrated in Figure 4; but in which the bearing seat 32, instead of being formed directly in the wall of the tube, is formed in a separate member having a flange 33 which lies between the flange 30 and the inner edge of the disc 31 when the parts are assembled; this being a method of construction as above explained whereby the flange for supporting the brake disc and the bearing seat may be more conveniently and accurately formed than when said elements are integral with the axle housing; and formed from a material of different thickness, or having different characteristics from those inherent in the material of the axle housing. In all cases, however, the axle housing is made from wrought metal, and the flange for the brake disc and the seat for the bearing when made integrally with said flange likewise of wrought metal; to thereby secure minimum weight of material combined with maximum strength and facility of manufacture in all cases; and to provide for the welding of the flange and bearing seat member to the axle housing in cases where the said member is formed as a part separate and distinct from the axle housing.

The inner periphery of the annular disc or plate which supports the brake preferably extends inward from the bearing seat and over the same to an extent sufficient to prevent movement of the bearing along the driving axle in one direction, as shown at 34, and an inwardly extending shoulder 35 is also provided to prevent movement of the bearing in the other direction.

The seats to which the springs for supporting the frame and body of the vehicle are secured are likewise made from suitably shaped wrought metal blanks bent and shaped to provide substantially flat portions 36 extending beyond the tubular portion 13 of the housing both in front and to the rear thereof, and side portions or plates 37 having centrally located curved seats fitting closely to the periphery of said tube. In the form of my invention illustrated in Figures 1 and 2 these seats are welded to the axle housing along joints 38 where the curved seats contact with the housing; while in Figures 3 and 7 the side plates are provided with outwardly extending flanges 39 curved to fit the periphery of the housing tube 13 and secured thereto by rivets 40, as will be appreciated. These spring supports are usually arranged upon the under side of the axle housing and the springs drawn upward against them by U-shaped clamps extending about the axle housing in accordance with the usual practice in low swung vehicle bodies; although the supports may obviously be upon the upper sides of the axle housing, in which case the springs are supported upon them as distinguished from drawn up against them. The springs and clamps for securing them to the seats and to the axle housing are however not shown as my invention relates to the seats themselves irrespective to their arangement relative to the springs.

Having thus described and explained my invention I claim and desire to secure by Letters Patent:—

1. In combination, a rear axle housing formed from wrought metal and having a tubular portion through which a driving axle extends; a radially extending wrought metal flange and a cylindrical bearing seat integral with one another, and separate from said housing and secured to the outer end of the tubular portion thereof; and an annular outwardly extending brake supporting disc secured to said flange and the inner periphery of which disk overlies the bearing seat aforesaid.

2. In combination, a rear axle housing formed from wrought metal and having a tubular portion through which a driving axle extends; a wrought metal member having a bearing seat and a flange, and which member is welded to the end of the tubular portion aforesaid; and an annular brake supporting disk secured to said flange and extending outwardly from said bearing seat and relative to the axis of said tubular portion.

3. In combination, a rear axle housing formed from wrought metal and having a tubular portion through which a driving axle extends; a wrought metal member having a flange extending substantially radially relative to the axis of said tubular portion, and a cylindrical bearing seat integral with said flange, and which member is welded to the end of the tubular portion aforesaid; and an annular brake supporting disc secured to said flange and extending outwardly therefrom, and the inner periphery of which disc overlies the bearing seat aforesaid.

4. In combination, a rear axle housing formed from wrought metal and having a tubular portion through which a driving axle extends; and a spring supporting member formed from wrought metal and having a substantially flat portion, and side portions integral with said flat portion and spaced apart from one another and having recesses fitting the periphery of said tubular portions, and which side portions are in the form of plates arranged edgewise relative to said rear axle housing, and correspond in thickness with the thickness of said flat portion; said side portions being welded to said tubular portion along the joints between the edges of said recesses and said tubular portion.

In testimony whereof I affix my signature.

JOHN T. TRUMBLE.